(No Model.)
T. LINDSAY.
LEAD LINE CONTROLLER FOR FISHING NETS.
No. 587,839. Patented Aug. 10, 1897.
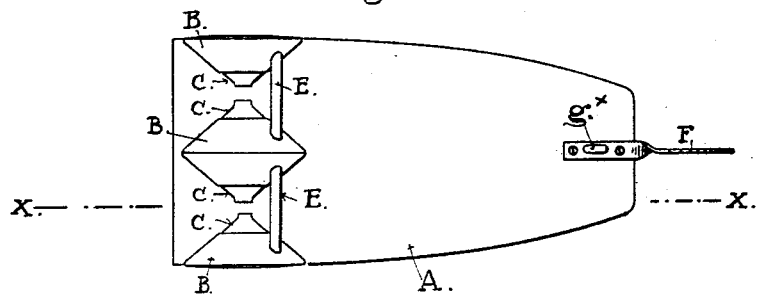
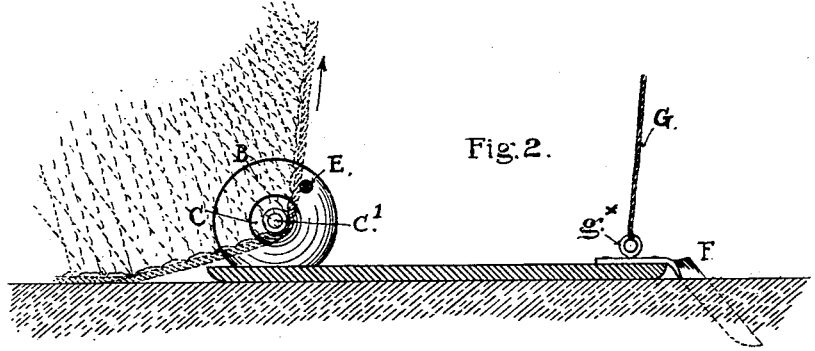
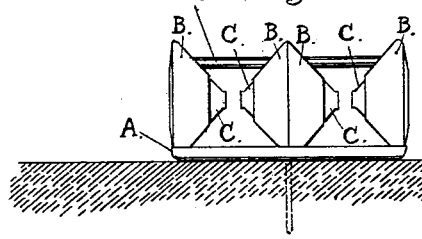
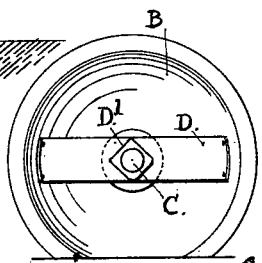
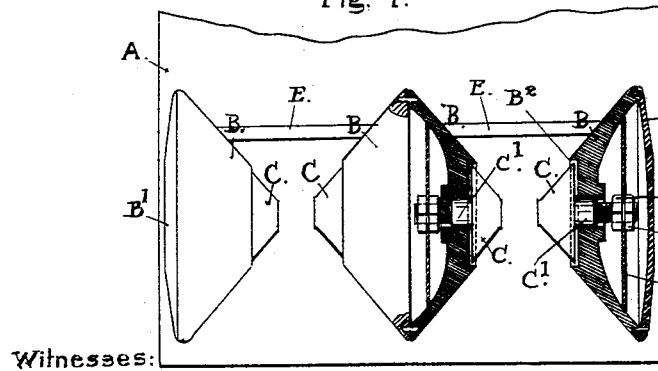
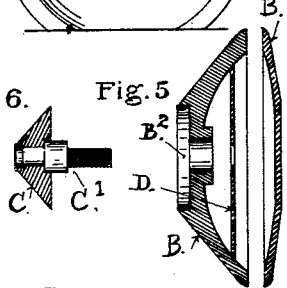
Witnesses:
M. Regner
E. Salomon
Inventor:
Thomas Lindsay
By Smith & Osborn
Attys.

UNITED STATES PATENT OFFICE.

THOMAS LINDSAY, OF CAPITOLA, CALIFORNIA.

LEAD-LINE CONTROLLER FOR FISHING-NETS.

SPECIFICATION forming part of Letters Patent No. 587,839, dated August 10, 1897.

Application filed December 7, 1896. Serial No. 614,768. (No model.)

*To all whom it may concern:*

Be it known that I, THOMAS LINDSAY, a subject of the Queen of Great Britain, residing at Capitola, county of Santa Cruz, and State of California, have invented certain new and useful Improvements in Lead-Line Controllers for Fishing-Nets, of which the following is a specification.

My invention relates to devices for controlling the bottom line, generally known as the "lead-line," of a fishing-net during the operation of drawing or hauling in, by means of which the bottom of the net is kept down against or in close relation to the sea-bottom and the sides or wings of the net are brought together in a gradually-contracting circle, with the lead-line so closely against the sea-bottom that the inclosed fish will not escape beneath the edges of the net.

The present invention comprising improvements in devices for this purpose has for its object to produce a simple and efficient device that will not become fouled or entangled in the net and will always be in condition for action, so that when set on the sea-bottom the controller can be relied on to operate properly.

The following description explains at length the nature of my said improvements and the manner in which I proceed to construct and apply and carry out the same, reference being had to the drawings that accompany and form part of this specification.

Figure 1 of the said drawings represents in plan or top view a lead-line controller constructed according to my said improvements; Fig. 2, a longitudinal section on the line $xx$; Fig. 3, an end elevation taken from the left-hand side of Fig. 1; Fig. 4, a top view, on an enlarged scale, of the sheaves and their conical guides, one set being shown in section; Figs. 5 and 6, sectional views in detail of the parts of a sheave and its conical guide separated from each other; Fig. 7, a rear view of the guide Fig. 5 with its back plate removed.

All the parts should be made of metal that will stand the action of sea-water.

A indicates a flat shoe or drag of proper weight to sink and remain on the bottom when in action.

B B are conical guides rigidly secured upon the top of the drag near one end in two sets or pairs to control the two sides or section of the lead-line, those of each pair having their smaller ends presented toward each other at proper distance apart to afford clearance for the meshes of the net between the adjacent faces of the sheaves or rollers C C, that are mounted in such smaller ends of the guides. The rollers have conical faces corresponding in pitch or taper with the stationary guides, and the smaller end of each cone is recessed at $B^2$ to take in and extend over the larger end of the roller. The cone is also bored centrally for a spindle $C'$, on which the roller is mounted to turn smoothly, and provision is made for securing each spindle in the cone so that a limited longitudinal adjustment of the same is afforded, that the space or opening between the rollers may be increased or diminished according to the thickness of the mesh and the size of the lead-line of the net being used with the controller, it being understood that the width of this opening is regulated to allow the meshes of the net to pass freely between the rollers, but to confine the lead-line under the rollers and prevent it from slipping through the opening.

The spindle of the roller is threaded on the outer end for jam-nuts $D'$ and is inserted through a hole in a bridge-plate D within the conical guide, against which part the nuts are screwed from opposite sides. By this means the rollers are adjusted to work at a greater or less distance apart, as circumstances require. The conical guides are recessed at the larger end of each, and the recess is closed in by a removable back $B'$ to afford access to the spindle. The construction is the same in all the sets or pairs; but as the bases or larger ends of the two middle cones are placed directly together the larger end of one cone serves to cover the corresponding end of the other one, and separate covers or backs like those on the outer cones are dispensed with. This construction is well shown in Figs. 4 and 5 of the drawings.

Between the conical guides of each set of rollers a stiff rod or round bar E is firmly fixed in a horizontal position above the line of the opening between the rollers and on the rear side or that side of the controller from which the lead-line runs upward to the surface. The function of this rod is to keep the lead-line in place between the conical guides and prevent it from catching under the cones.

The fluke or tailpiece F on the end of the drag acts to keep the drag in a straight line while moving on the sea-bottom and prevent the controller from swinging sidewise. This piece projecting from the end of the drag is rigidly secured in place to stand at an inclination downward and with sufficient projection below the bottom of the drag to take hold of the sea-bottom. An eye $g^\times$ is also fixed at the same end of the drag for securing a line G, by which the controller is drawn to the surface.

Having thus fully described my invention, what I claim as new, and desire to secure by Letters Patent, is—

1. A lead-line controller having stationary conical-shaped guides arranged in pairs upon and transversely across the top of a weighted drag, conical rollers in the ends of said guides mounted for rotation upon spindles that are adjustable longitudinally in the guides, a fixed guide-bar above the said rollers and between the conical guides, and a fluke on the tail of the drag, constructed for operation as set forth.

2. In a lead-line controller for fishing-nets, the combination of a drag, conical guides fixed upon the drag with the smaller ends of the cones composing each pair set toward each other, a conical roller recessed in the smaller end of each guide, a horizontally-adjustable spindle mounted in each guide and carrying the roller on the outer end, and a guide-bar between the cones of each pair of rollers and above the line of the opening between the rollers, substantially as set forth.

In testimony that I claim the foregoing I have hereunto set my hand and seal.

THOMAS LINDSAY. [L. S.]

Witnesses:
C. W. M. SMITH,
CHAS. E. KELLY.